(12) United States Patent
Zeggert

(10) Patent No.: US 7,480,854 B2
(45) Date of Patent: Jan. 20, 2009

(54) DATA CONVERSION SYSTEM AND METHOD

(75) Inventor: Debra L. Zeggert, Binghamton, NY (US)

(73) Assignee: International Business Machines Corporation, Armonk, NY (US)

( * ) Notice: Subject to any disclaimer, the term of this patent is extended or adjusted under 35 U.S.C. 154(b) by 1352 days.

(21) Appl. No.: 09/969,429

(22) Filed: Oct. 2, 2001

(65) Prior Publication Data

US 2003/0070141 A1    Apr. 10, 2003

(51) Int. Cl.
*G06F 17/27* (2006.01)
*G06F 17/21* (2006.01)

(52) U.S. Cl. .................. 715/217; 715/212; 715/227; 715/243; 707/100; 707/101

(58) Field of Classification Search .......... 715/500, 715/503, 504, 509, 517, 526, 200, 212, 217, 715/227, 243, 273; 707/100, 101, 102, 104.1
See application file for complete search history.

(56) References Cited

U.S. PATENT DOCUMENTS

| | | | |
|---|---|---|---|
| 5,317,686 A * | 5/1994 | Salas et al. ............ | 715/503 |
| 5,557,787 A * | 9/1996 | Shin et al. ............ | 707/102 |
| 5,584,026 A | 12/1996 | Knudsen et al. | |
| 5,729,730 A * | 3/1998 | Wlaschin et al. ....... | 707/3 |
| 5,752,025 A | 5/1998 | Shakib et al. | |
| 5,778,350 A | 7/1998 | Adams et al. | |
| 5,828,842 A * | 10/1998 | Sugauchi et al. ....... | 709/223 |
| 5,835,917 A * | 11/1998 | Shin et al. ............ | 715/509 |
| 5,893,087 A * | 4/1999 | Wlaschin et al. ....... | 707/3 |
| 5,970,506 A * | 10/1999 | Kiyan et al. .......... | 715/503 |
| 5,987,481 A * | 11/1999 | Michelman et al. ...... | 715/503 |
| 5,999,928 A | 12/1999 | Yan | |
| 6,006,219 A | 12/1999 | Rothschild | |
| 6,006,232 A | 12/1999 | Lyons | |
| 6,016,497 A | 1/2000 | Suver | |
| 6,034,697 A | 3/2000 | Becker | |
| 6,078,924 A | 6/2000 | Ainsbury et al. | |
| 6,092,061 A | 7/2000 | Choy | |
| 6,134,558 A | 10/2000 | Hong et al. | |
| 6,151,604 A * | 11/2000 | Wlaschin et al. ....... | 707/100 |
| 6,161,103 A | 12/2000 | Rauer et al. | |
| 6,163,775 A * | 12/2000 | Wlaschin et al. ....... | 707/3 |
| 6,601,065 B1 * | 7/2003 | Nelson et al. ......... | 707/4 |
| 6,675,351 B1 * | 1/2004 | Leduc ................ | 715/503 |
| 2001/0039548 A1 * | 11/2001 | Shinkai et al. ........ | 707/201 |

OTHER PUBLICATIONS

Free On-Line Dictionary Of Computing, table from FOLDOC, Jun. 4, 1997, FOLDOC, <http://foldoc.doc.ic.ac.uk/foldoc/foldoc.cgi?query=table>.*

* cited by examiner

*Primary Examiner*—Joshua D Campbell
(74) *Attorney, Agent, or Firm*—William E. Schiesser; Hoffman Warnick LLC

(57) ABSTRACT

A data conversion system and method are provided. Specifically, under the present invention, a collection of data records is received from a first application. The data records include data fields for storing data entries, with at least one of the data fields including multiple data entries. Each data entry is tagged with a corresponding data header (meta data) and individually arranged, along with a corresponding record identifier, into a separate row of a table. This eliminates any multiple value data fields so that the data can be more accurately manipulated and reported by a second application.

14 Claims, 3 Drawing Sheets

50 ⟶

| IMPACTED 54A | ID 54B | |
|---|---|---|
| IMPACTED | ID | — 52A |
| DEBI-OUT | 1 | — 52B |
| DEBI-OUT | 3 | — 52C |
| FRED-IN | 2 | — 52D |
| FRED-UNK | 1 | — 52E |
| FRED-UNK | 3 | — 52F |
| TIM-IN | 1 | — 52G |
| TIM-IN | 4 | — 52H |
| JENNIFER-IN | 1 | — 52I |
| JENNIFER-OUT | 4 | — 52J |

| ID | IN_PLAN | OUT_PLAN | UNKNOWN |
|---|---|---|---|
| 1 | TIM<br>JENNIFER<br>40A | DEBI<br>40B | FRED<br>40C |
| 2 | FRED<br>40D | 40E | 40F |
| 3 | 40G | DEBI<br>40H | FRED<br>40I |
| 4 | TIM<br>40J | JENNIFER<br>40K | 40L |

*FIG. 2*

| IMPACTED | ID |
|---|---|
| DEBI-OUT | 1 |
| DEBI-OUT | 3 |
| FRED-IN | 2 |
| FRED-UNK | 1 |
| FRED-UNK | 3 |
| TIM-IN | 1 |
| TIM-IN | 4 |
| JENNIFER-IN | 1 |
| JENNIFER-OUT | 4 |

FIG. 3

DATA CONVERSION SYSTEM AND METHOD

BACKGROUND OF THE INVENTION

1. Field of the Invention

The present invention generally relates to a data conversion system and method. More particular, the present invention relates to a system and method in which data entries from a collection of data records are organized into a table for generation of a report and/or transferring data between different software systems, data systems, etc.

2. Background Art

As the use of computer technology becomes more prevalent, companies are increasingly seeking high technology solutions to track job performance. Specifically, a company may undertake numerous projects that require several tasks to be completed. In many instances, such projects are performed by numerous individuals with each individual being assigned one or more tasks in the project. For example, company "A" might desire to have a computer server set up in the human resources department. This project could be assigned to the information technology (IT) department (or an outside provider), which would assign any necessary tasks for completing the project to certain individuals. Thus, individual "A" might be responsible for setting up the hardware, individual "B" might be responsible for setting up the software, and individual "C" might be responsible for networking the server. In such a case, it would be valuable to track and report the status of the assigned tasks. However, since a company could be performing numerous projects simultaneously, and each project could involve numerous individuals, accurate tracking and reporting of this information is difficult. Specifically, in many instances, the data is initially collected and organized using a first (software) application. The data may then be transferred to a second (software) application that generates any desired reports. However, the format of the data as organized by the first application may be incompatible or foreign to the second application. For example, the first application may organize the data so that multiple data entries appear in the same data field (i.e., a multiple value data field). However, the second application might not be able to interpret/handle multiple value fields. Thus, there exists a danger that reports generated by the second application are inaccurate.

Heretofore, attempts have been made at developing computerized solutions to track and report project data. Such attempts, however, fail to provide a way to accurately convert data from a format of a first application (i.e., first format) to a format of a second application (i.e., second format). For example, no such attempt provides a way for multiple value fields generated by a first application to be converted to single value fields for use by a second application. Moreover, no such attempt creates a relationship between data entries and data headers so that common occurrences can be readily identified.

In view of the foregoing, there exists a need for a data converting system and method. Specifically, a need exists for a system and method whereby data can be converted from a first format to a second format. A further need exists for a multiple value data field, as used by a first application, to be converted to a single value data field for use by a second application.

SUMMARY OF THE INVENTION

The present invention overcomes the drawbacks of the related art by providing a data converting system and method. Specifically, under the present invention, a collection of data records having data fields for storing data entries is received from a first application. Each data entry is tagged with a corresponding data header to create a relationship therebetween. A table is then constructed based upon the data records whereby the sets of tagged data entries and data headers are separately arranged into rows. These rows also include a record identifier corresponding to the data entry. A report based upon the table can then be generated by a second application. Thus, even if the collection of records includes a data field with more than one data entry, the individual tagging and organizing of the data entries into a separate row of the table allows the data to be accurately manipulated and/or reported by the second application.

According to a first aspect of the present invention, a method for converting data from a first format to a second format is provided. The method comprises the steps of: (1) providing a plurality of data fields for storing data entries, wherein at least one of the data fields has a plurality of data entries, and wherein each data field has an associated data header and an associated record identifier; and (2) building a table based upon the data entries, wherein the table comprises rows having a single data entry, a corresponding data header, and a corresponding record identifier.

According to a second aspect of the present invention, a method for converting data from a first format to a second format is provided. The method comprises the steps of: (1) providing a plurality of data records having data fields for storing data entries, wherein at least one of the data fields has a plurality of data entries, and wherein each data field has an associated data header and an associated record identifier; (2) tagging each data entry in the data fields with a corresponding data header; and (3) building a table based upon the data records, wherein the table has rows that comprise a single data entry, a corresponding tagged data header, and a corresponding record identifier.

According to a third aspect of the present invention, a method for converting data from a first format to a second format is provided. The method comprises the steps of: (1) providing a plurality of data records having data fields for storing data entries, wherein at least one of the data fields has a plurality of data entries, and wherein each data field has an associated data header and an associated record identifier; (2) building a table based upon the data records, wherein the table has rows that comprise a single data entry, a corresponding data header, and a corresponding record identifier; and (3) selecting predetermined rows of the table and arranging the selected rows into a report.

According to a fourth aspect of the present invention, a system for converting data from a first format to a second format is provided. The system comprises: (1) a data system for receiving data records having data fields for storing data entries, wherein at least one of the data fields has a plurality of data entries, and wherein each data field has an associated data header and an associated record identifier; and (2) a table system for building a table based upon the data records, wherein the table comprises rows that have a single data entry, a corresponding data header, and a corresponding record identifier.

According to a fifth aspect of the present invention, a system for converting data from a first format to a second format is provided. The system comprises: (1) a data system for receiving data records having data fields for storing data entries, wherein at least one of the data fields has a plurality of data entries, and wherein each data field has an associated data header and an associated record identifier; (2) a relationship system for tagging each data entry in the data fields with a corresponding data header; (3) a table system for building a table based upon the data records, wherein the table comprises rows that have a single data entry, a corresponding tagged data header, and a corresponding record identifier; and (4) an output system for outputting the table to a report generation application, wherein the report generation application generates a report based upon selected rows of the table.

According to a sixth aspect of the present invention, a program product stored on a recordable medium for converting data from a first format to a second format is provided. When executed, the program product comprises: (1) program code configured to receive data records having data fields for storing data entries, wherein at least one of the data fields has a plurality of data entries, and wherein each data field has an associated data header and an associated record identifier; and (2) program code configured to build a table based upon the data records, wherein the table comprises rows that have a single data entry, a corresponding tagged data header, and a corresponding record identifier.

Therefore, the present invention provides a data converting system and method.

BRIEF DESCRIPTION OF THE DRAWINGS

These and other features and advantages of this invention will be more readily understood from the following detailed description of the various aspects of the invention taken in conjunction with the accompanying drawings in which:

FIG. 2 depicts an exemplary view of a collection of records.

FIG. 3 depicts an exemplary view of a table according to the present invention.

Figure 1:
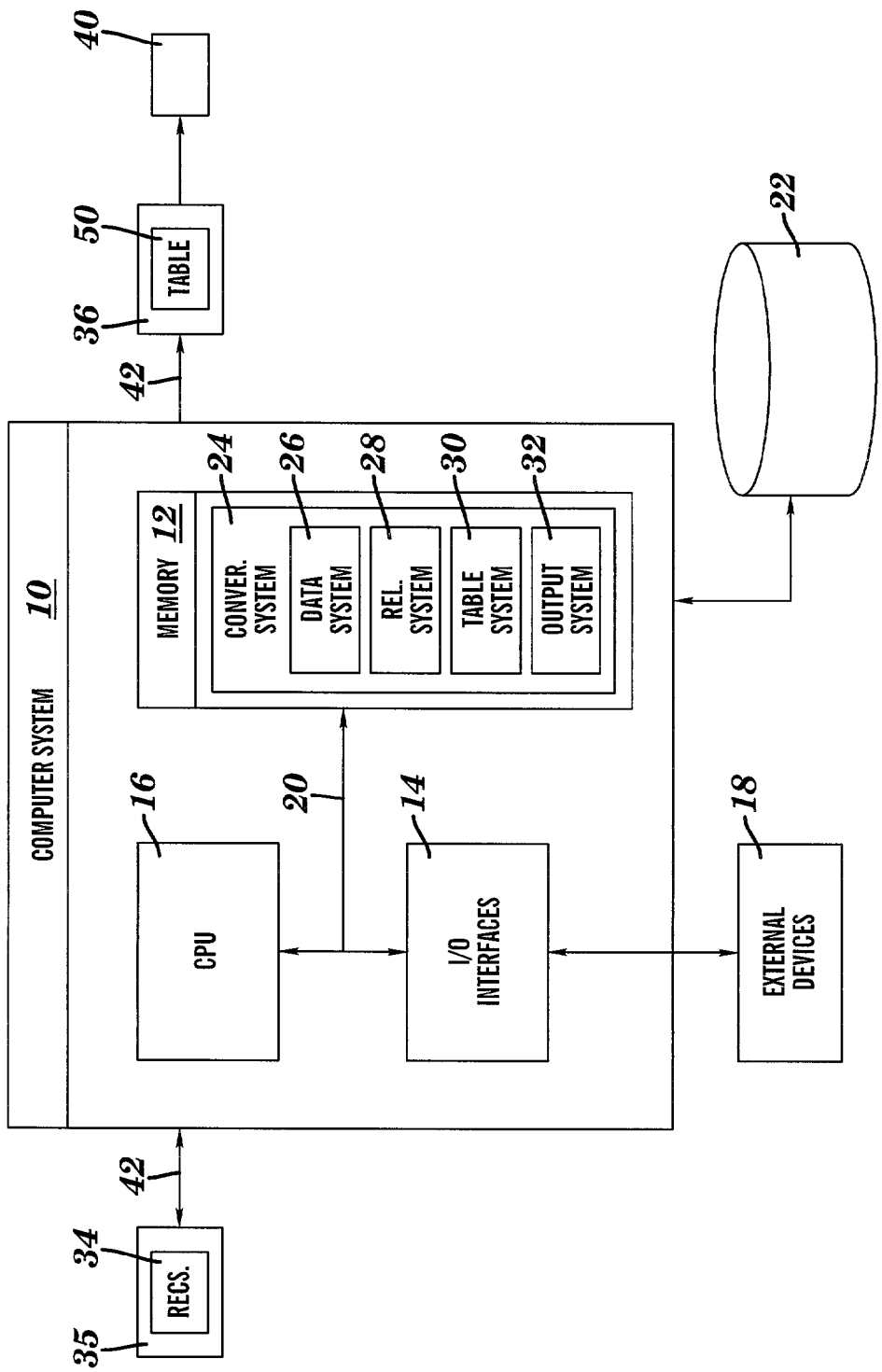
FIG. 1 depicts a computer system having a converting system according to the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

In general, the present invention provides a data converting system and method. Specifically, under the present invention, a plurality of data records having data fields for storing data entries is received from a first application. Each field has an associated record identifier and data header (i.e., "meta data," which describes the data entries). Moreover, at least one of the data fields could include more than one data entry (i.e., a multiple value data field). However, as indicated above, many applications cannot accurately handle/manipulate multiple value data fields. Accordingly, a one-to-one relationship between each data entry and a corresponding data header will be developed so that each data entry can be arranged into a single value data field that another application can accurately manipulate. The relationship is preferably developed by tagging each data entry in the data fields with a corresponding data header. Then, a table is built based upon the records for arranging the data entries, the corresponding data headers, and the corresponding record identifiers. Specifically, each set of tagged data entry and data header will be arranged into a separate row in the table along with a corresponding record identifier. This allows a single multiple value data field of the records to be re-organized into multiple single value fields.

Referring now to FIG. 1, computer system 10 is shown. Computer system 10 generally comprises memory 12, input/output interfaces 14, a central processing unit (CPU) 16, external devices/resources 18, bus 20, and database 22.

Stored in memory 12 of computer system 10 is converting system 24 (shown in FIG. 1 as a software product). Converting system 24 will be described in more detail below but generally provides a system and method for converting data from a first format to a second format. Memory 12 may comprise any known type of data storage and/or transmission media, including magnetic media, optical media, random access memory (RAM), read-only memory (ROM), a data cache, a data object, etc. Moreover, memory 12 may reside at a single physical location, comprising one or more types of data storage, or be distributed across a plurality of physical systems in various forms. CPU 16 may likewise comprise a single processing unit, or be distributed across one or more processing units in one or more locations, e.g., on a client and server.

I/O interfaces 14 may comprise any system for exchanging information from an external source. External devices 18 may comprise any known type of external device, including a CRT, LED screen, hand-held device, keyboard, mouse, voice recognition system, speech output system, printer, facsimile, pager, personal digital assistant, cellular phone, web phone, etc. Bus 20 provides a communication link between each of the components in the computer system 10 and likewise may comprise any known type of transmission link, including electrical, optical, wireless, etc. In addition, although not shown, additional components, such as cache memory, communication systems, system software, etc., may be incorporated into computer system 10.

Database 22 provides storage for information necessary to carry out the present invention. Such resources could include, inter alia: (1) data entries; (2) data headers; and (3) record identifiers. Database 22 may include one or more storage devices, such as a magnetic disk drive or an optical disk drive. In another preferred embodiment database 22 includes data distributed across, for example, a local area network (LAN), wide area network (WAN) or a storage area network (SAN) (not shown). Database 22 may also be configured in such a way that one of ordinary skill in the art may interpret it to include one or more storage devices.

Under the present invention, data records 34 are received from a first application 35. Referring to FIG. 2, an exemplary view of four data records 34A-D is depicted. Each data record 34A-D shown preferably pertains to a particular work project. For example, data record 34A could pertain to the project of setting up a computer server, while data record 34B could pertain to installing a router. As further shown, records 34A-D include data fields 40A-L for storing data entries 46A-I. In the current example, data entries 46A-I are individuals who have been assigned one or more task in the respective projects of data records 34A-D. For example, "Tim," "Jennifer," "Debi," and "Fred" have all been assigned one or more tasks for the project represented by data record 34A. As further shown, each data field 40A-L has an associated data header 42A-C and record identifier 44A-D.

Data headers 42A-C (or "meta data" as known in the art) describe or define data entries 46A-I in data fields 40A-L. The data headers 42A-C shown include "In_Plan," 42A "Out_Plan," 42B and "Unknown" 42C. Individuals listed under the "In_Plan" data header 42A are those that have been assigned tasks that were planned for the particular project. Thus, "Tim" 46A and "Jennifer" 46B have been assigned tasks that were part of the plan for completing the project represented by data record 34A. If, as indicated above, data record 34A relates to the project of setting up a computer server, "Tim" 46A and "Jennifer" 46B could be responsible for installing computer server hardware. "Out_Plan" data header 42B indicates individuals that have been assigned tasks that are outside of the plan for the particular project. For example, "Debi" 46C could be responsible for obtaining legal department approval, not ordinarily part of the plan for setting up a computer server. "Unknown" data header 42C identifies individuals that have been assigned tasks that cannot be readily categorized as either "In_Plan" or "Out_Plan." For example, "Fred" 46D could be responsible for providing instructional use of new equipment, which is under consideration to become "In_Plan."

Record identifiers 44A-D are values assigned to each record 34A-D for easy identification thereof. For example, if data records 34A-D pertain to work projects, each data record 34A-D could be assigned a unique identifier 44A-D that identifies the underlying project. Thus, record identifier "1" 44A could identify the project of setting up a computer server. As further shown in FIG. 2, it is not necessary for each data field to include a data entry (e.g., data field 40G). Moreover, data fields can include more than one data entry (e.g., data field 40A). It should be appreciated that the data records 34A-D shown in FIG. 2 are intended to be illustrative only. For example, data entries 46A-I need not identify individuals. Rather, data entries 46A-I could identify departments. Moreover, the quantity and type of data headers 42A-C and record identifiers 44A-D could vary depending on the content and purpose of data records 34A-D. For example, a company may not categorize tasks in a project as "In_Plan," "Out_Plan," or "Unknown." In contrast, a company may choose to utilize data headers of "Under_Budget," or "Over_Budget."

In any event, the data records 34A-D shown in FIG. 2 are similar to those produced by Lotus Notes. As indicated above, however, many other applications (e.g., DB2) cannot manage multiple value data fields such as data field 40A. Accordingly, although other applications may be better suited to report and depict the data, they cannot be used with data records 34A-D. To overcome this problem, the present invention converts the data to a second, more manageable format.

Referring back to FIG. 1, data records 34 are received by data system 26 of conversion system 24. In an alternative embodiment, the received data records 34 could be stored in database 22 and accessed as needed by data system 26. In either scenario, relationship system 28 will interpret the data records 34 and create a relationship between data entries and data headers. This is preferably accomplished by individually tagging each data entry with its corresponding data header. Thus, for the example data record 34A shown in FIG. 2, "Tim" 46A and "Jennifer" 46B will be tagged with "In_Plan" data header 42A.

Once all data entries have been tagged, table system 30 will create a table. Each set of tagged date entries and data headers will then be arranged into a separate row of the table along with the corresponding record identifier. FIG. 3 shows an exemplary table 50 as created by table system 30. As depicted, table 50 includes rows 52A-J. Each row has two data fields 54A-B. Data fields 54A-B of row 52A identify the type of data that appears in each data field therebelow. Specifically, data field 54A of rows 52B-J includes a data entry tagged with a corresponding data header while data field 54B includes the corresponding record identifier. For example, row 52B includes the data entry "Debi" tagged with the data header "Out_Plan" and the record identifier "1." Referring back to FIG. 2, it can be seen that this refers to data field 40B of data record 34A. By arranging the data as shown in table 50 of FIG. 3, all multiple value data fields have been converted into individual single value data fields. For example, data field 40A of FIG. 2 includes two data entries, namely, "Tim" 46A and "Jennifer" 46B. Under the present invention, each entry has been tagged with the corresponding "In_Plan" data header 42A and stored in separate rows 52G and 52I of table 50 along with the corresponding record identifier "1" 44A. Not only does this eliminate multiple value data fields, but it also eliminates blank data fields such as data field 40E of FIG. 2.

Once the table 50 has been completed, output system 32 will transfer the table 50 to a second application 36 for generation of a report 40. Since multiple value data fields have been eliminated, the second application can accurately manipulate and arrange the data into a report. In generating a report, a user can preferably select particular rows of the table, which are then arranged into a report. This allows a user maximum flexibility in generating a report for particular projects or segments of data. For example, a user may wish to view a report only for the project corresponding to record identifier "1" (e.g., setting up a computer server). In this case, the user would select rows 52B, 52E, 52G, and 52I of table 50 for reporting. It should be understood that although FIG. 1 depicts records 34 being received from a first external application 35, and table 50 being transferred to a second external application 36, other variations could exist. For example, first application 35 and second application 36 could be internal to computer system 10.

It should be understood that table 50 depicted in FIG. 3 is a preferred embodiment only and other variations could exist. For example, any order/combination of data header and data entry could be utilized. Specifically, the data headers could be before, after, or embedded with the data entries. Moreover, a multidimensional table could be utilized that yields numerous relationship possibilities.

As further depicted in FIG. 1 communication with computer system 10 occurs via communication links 42. Communications links 42 can include a direct hardwired connection (e.g., serial port) to the computer system 10, or an addressable connection such as a remote system in a client-server environment. In the case of the latter, the client and server may be connected via the Internet, wide area networks (WAN), local area networks (LAN) or other private networks. The server and client may utilize conventional token ring connectivity, Ethernet, or other conventional communications standards. Where the client is connected to the system server via the Internet, connectivity could be provided by conventional TCP/IP sockets-based protocol. In this instance, the client would utilize an Internet service provider outside the system to establish connectivity to the system server within the system.

It is understood that the present invention can be realized in hardware, software, or a combination of hardware and software. Moreover, any kind of computer/server system(s)—or other apparatus adapted for carrying out the methods described herein—is suited. A typical combination of hardware and software could be a general purpose computer system with a computer program that, when loaded and executed, controls computer system 10 such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A method for converting data from a first format to a second format, comprising the steps of:
   providing a plurality of data fields for storing data entries, wherein at least one of the data fields has a plurality of data entries that are not separately addressed, and wherein each data field has an associated data header and an associated record identifier; and
   building a table based upon the data entries, wherein the table comprises rows having a single data entry, a corresponding data header, and a corresponding record identifier in a separate field from the corresponding data header.

2. The method of claim 1, further comprising the step of selecting predetermined rows of the table and arranging the selected rows to generate a report.

3. The method of claim 1, wherein the building step comprises the step of tagging each data entry in the data fields with a corresponding data header.

4. The method of claim 1, wherein each row in the table comprises a first data field and a second data field.

5. The method of claim 4, wherein the first data field of at least one row comprises a single data entry tagged with a corresponding data header, and wherein the second data field of the at least one row comprises a record identifier corresponding to the single data entry.

6. A method for converting data from a first format to a second format, comprising the steps of:
   providing a plurality of data records having data fields for storing data entries, wherein at least one of the data fields has a plurality of data entries that are not separately addressed, and wherein each data field has an associated data header and an associated record identifier;
   tagging each data entry in the data fields with a corresponding data header; and
   building a table based upon the data records, wherein the table has rows that comprise a single data entry, a corresponding tagged data header, and a corresponding record identifier in a separate field from the corresponding data header.

7. The method of claim 6, wherein each row of the table comprises a first data field and a second data field.

8. The method of claim 7, wherein the first data field of at least one row comprises a single data entry and a corresponding tagged data header.

9. The method of claim 8, wherein the second data field of the at least one row comprises a record identifier corresponding to the single data entry.

10. The method of claim 6, further comprising the step of selecting predetermined rows of the table and arranging the selected rows into a report.

11. A method for converting data from a first format to a second format, comprising the steps of:
    providing a plurality of data records having data fields for storing data entries, wherein at least one of the data fields has a plurality of data entries that are not separately addressed, and wherein each data field has an associated data header and an associated record identifier;
    building a table based upon the data records, wherein the table has rows that comprise a single data entry, a corresponding data header, and a corresponding record identifier in a separate field from the corresponding data header; and
    selecting predetermined rows of the table and arranging the selected rows into a report.

12. The method of claim 11, wherein the building step comprises the step of tagging each data entry in the data fields with a corresponding data header.

13. The method of claim 11, wherein each row of the table includes a first data field and a second data field.

14. The method of claim 13, wherein the first data field of at least one row comprises a single data entry and a corresponding data header, and wherein the second data field of the at least one row comprises a record identifier corresponding to the single entry.

* * * * *